United States Patent [19]

Kazami et al.

[11] Patent Number: 5,070,357
[45] Date of Patent: Dec. 3, 1991

[54] BATTERY CHECK DEVICE FOR CAMERAS

[75] Inventors: Kazuyuki Kazami, Tokyo; Koichi Daitoku, Sagamihara; Akira Ezawa; Kazuto Ohtsuka, both of Tokyo; Hideya Inoue, Yokohama, all of Japan

[73] Assignee: Nikon Corporation, Tokyo, Japan

[21] Appl. No.: 620,746

[22] Filed: Dec. 3, 1990

[30] Foreign Application Priority Data

Dec. 5, 1989 [JP] Japan .................................. 1-315669
Dec. 14, 1989 [JP] Japan .................................. 1-324519

[51] Int. Cl.$^5$ ............................................. G03B 17/18
[52] U.S. Cl. ................................ 354/468; 354/484; 354/127.12; 354/217
[58] Field of Search ................. 354/484, 127.12, 217, 354/468

[56] References Cited

U.S. PATENT DOCUMENTS 4,716,433 12/1987 Alyfuku ............................. 354/468
4,855,781 8/1989 Hoshino ............................ 354/468

FOREIGN PATENT DOCUMENTS 60-230639 11/1985 Japan .
60-230640 11/1985 Japan .

Primary Examiner—Michael L. Gellner
Attorney, Agent, or Firm—Shapiro and Shapiro

[57] ABSTRACT

The battery check device for cameras comprises a counting device for counting the number of times photographing is performed by cameras, a detecting means for detecting the remainder of the capacity of batteries, and a determining device for determining the number of the remaining pictures which can be taken on the basis of the detected remainder of the capacity of batteries.

8 Claims, 9 Drawing Sheets

BATTERY CHECK DEVICE FOR CAMERAS

BACKGROUND OF THE INVENTION

1. Field of the Invention

This invention relates to cameras having a battery check device.

2. Related Background Art

It has been conventionally known that there are cameras which detect the power supply voltage (the voltage of power supply batteries) each time half-push operation is performed on a release button, determine and alarm that photographing is disabled when the power supply voltage is lower than a predetermined value. They enable photographers to know the time for replacement of batteries, but there is inconvenience to photographers in the case that they have no new battery where no measure can be taken because photographing has already been disabled when the alarm is given.

It is known that there are cameras which have two-step battery check function wherein a preliminary alarm is given before the cameras become disabled and an alarm is given when photographing has been disabled. With this function, it is possible to know that little battery capacity is left and to take measures such as preparing new batteries. Also, it is known that there are cameras such as those disclosed by U.S. Pat. No. 4,716,433 which count the number of times photographing is performed, calculate and display in stages the remainder of battery capacity on the basis of the count. With this function, it is possible to know the remainder of the battery capacity any time, and when little battery capacity is left, measures such as preparing new batteries as described above can be taken.

However, what photographers really want to know is how many photographs can be taken with the remainder of the battery capacity while the preliminary alarm and the display of the remainder of the battery capacity as described above can only provide a rough idea on such and it is not possible to know specifically how many photographs can be taken, and thus what is really demanded by photographers has not been satisfied.

SUMMARY OF THE INVENTION

The object of this invention is to provide a battery check device which enables photographers to recognize how many photographs can be taken.

Referring to FIG. 1, this invention is applied to a battery check device for cameras which incorporate an electronic flashing device 101 and which can perform flashed photographing utilizing the electronic flashing device 101 and normal photographing wherein the electric flashing device 101 is not used. This invention comprises a counting means 102 which counts the number of times each of flashed photographing and normal photographing is performed, a ratio calculating means 103 which calculates the ratio of flashed photographing and normal photographing on the basis of the said number of times photographing is performed, a capacity detecting means 104 which detects the capacity of batteries, and a frame number calculating means 105 which calculates the number of the remaining frames available for photographing on the basis of the ratio calculated and the remainder of the battery capacity detected, whereby the above technical problem are solved.

The counting means 102 counts the number of times each of flashed photographing and normal photographing is performed, and the ratio calculating means 103 calculates the ratio of flashed photographing and normal photographing on the basis of the number of times each type of photographing is performed. The frame number calculating means 105 calculates the number of the remaining frames available for photographing on the basis of the ratio calculated and the remainder of the battery capacity detected by the capacity detecting means 104. The number of the remaining frames available for photographing is displayed, for example, by a display device which is not shown.

Referring further to FIG. 7A and FIG. 7B, this invention is applied to cameras having a battery check device 1101 which detects whether the power supply voltage is lower than a predetermined voltage or not.

As shown in FIG. 7A, this invention comprises a counting means 1102 which counts the number of times photographing is performed and a frame number calculating means 1103 which calculates the number of the remaining frames which can be photographed with the batteries which are newly installed, whereby the above technical problems are solved.

As shown in FIG. 7B, this invention also comprises a counting means 1201 which counts the number of times photographing is performed, a detecting means 1202 which detects the replacement of power supply batteries, and a frame number calculating means 1203 which calculates the number of frames which can be photographed with the batteries which are newly installed when the power supply voltage is lower than a predetermined voltage at the time of the replacement of the power supply batteries, on the basis of the number of times photographing has been performed at that time.

The frame number calculating means 1103 calculates the number of frames which can be photographed with the batteries which are newly installed, on the basis of the number of times photographing has been performed (counted by the counting means 1102) at the time the power supply voltage became lower than the predetermined voltage.

Photographers thereby can specifically know how many photographs can be taken thereafter.

The frame number calculating means 1203 calculates the number of frames which can be photographed with the batteries which are newly installed when the power supply voltage is lower than the predetermined voltage at the time of the replacement of the power supply batteries, on the basis of the number of times photographing has been performed at that time. The same advantage as described above thus can be obtained.

BRIEF DESCRIPTION OF THE DRAWINGS

FIG. 2 is a block diagram showing the overall configuration of a battery check device according to this invention; FIG. 3 is a drawing illustrative of an example of the display on a liquid crystal display device; FIG. 4 and FIG. 5 are a flow chart of the steps of treatment; FIG. 8 is a block diagram showing the control system of a camera according to this invention; and FIG. 9 through FIG. 11 are a flow chart of the steps of treatment.

FIG. 12 is a block diagram of the control system; and FIG. 13 is a flow chart of the steps of treatment.

DESCRIPTION OF THE PREFERRED EMBODIMENTS

An embodiment of this invention will be described with reference to FIG. 2 through FIG. 5.

Figure 1:
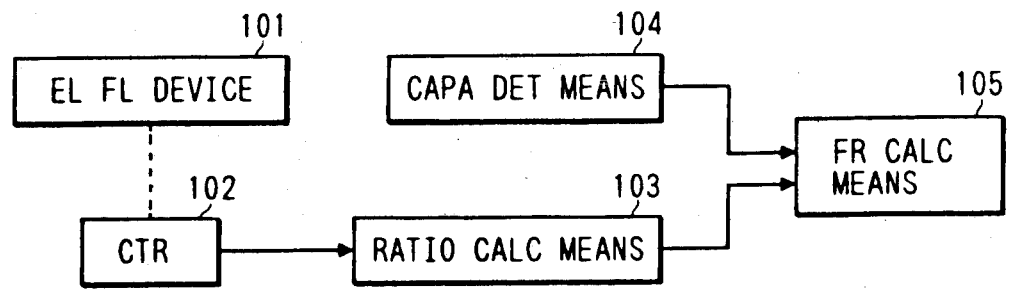
FIG. 1 is a drawing to explain this invention.
Figure 2:
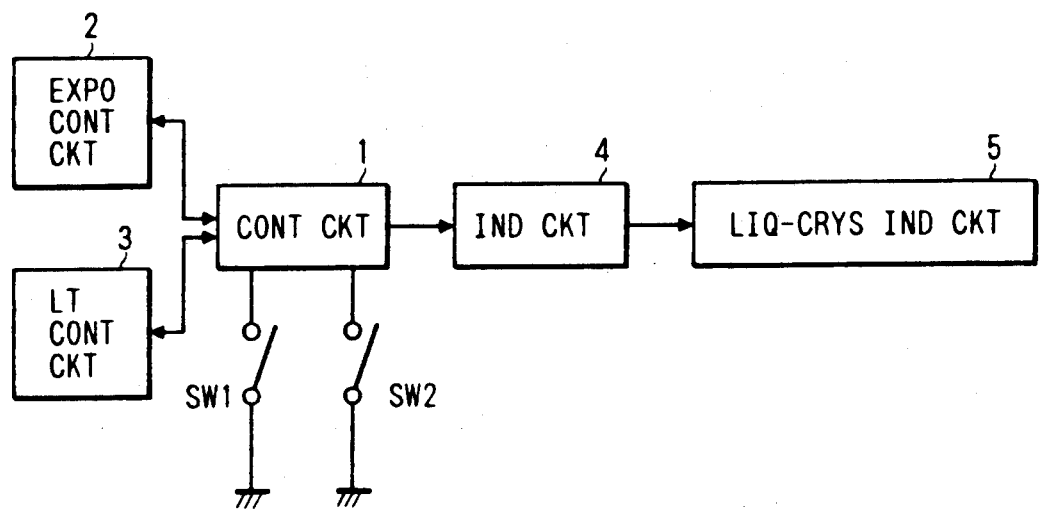
FIG. 2 through FIG. 5 are illustrative of an embodiment of this invention.

FIG. 2 shows the overall configuration of a battery check device of this invention wherein an exposure controlling circuit 2, a light controlling circuit 3 for the electronic flashing device, an indication circuit 4 of a liquid crystal indication device 5, and switches SW1 and SW2 are connected to a controlling circuit 1. The exposure controlling circuit 2 performs photographing by driving a diaphragm or a shutter which are not shown in response to the instruction from the controlling circuit 1, and the light controlling circuit 3 illuminates subjects by causing a light-emitting tube which is not shown to emit light when photographing is performed in response to the instruction from the controlling circuit 1.

Note that the photographing wherein the said light-emitting tube emits light, that is, the photographing wherein the electronic flashing device is used is referred to as flashed photographing, and the photographing wherein the electronic flashing device is not used is referred to as normal photographing.

Figure 3:
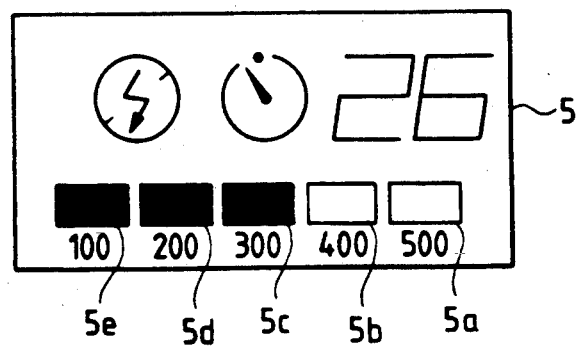

The liquid crystal indication device 5 is, for example, configurated as shown in FIG. 3, and the indication circuit 4 indicates, on the liquid crystal indication device 5, the film counts, whether self timer mode is set or not, or whether the electronic flashing device is used or not. Also, five segments 5a through 5e are provided on the liquid crystal indication device 5, and the indication circuit 4 indicates the number of the remaining frames available for photographing using the segments 5a through 5e, in response to a display signal from the controlling circuit 1. One segment corresponds to 100 frames; for example, when the segments 5c through 5e are lit, it means that 300 frames are available for photographing; and when all the segments 5a through 5e are lit, it means that 500 frames are available for photographing.

The switches SW1 and SW2 are switches which turn on in response to the operation of a release button; the switch SW1 turns on when half-push operation is performed on the release button; and the switch SW2 turns on when the button is fully pushed.

The controlling circuit 1 performs photographing when the switch SW2 turns on, counts the number of times each of flashed photographing and normal photographing is performed, and calculates and displays the number of the remaining frames available for photographing on the basis of the counts and the remainer of the battery capacity.

Next the steps of the control which is carried out by the controlling circuit 1 will be described with reference to the flow chart in FIG. 4.

Figure 4:
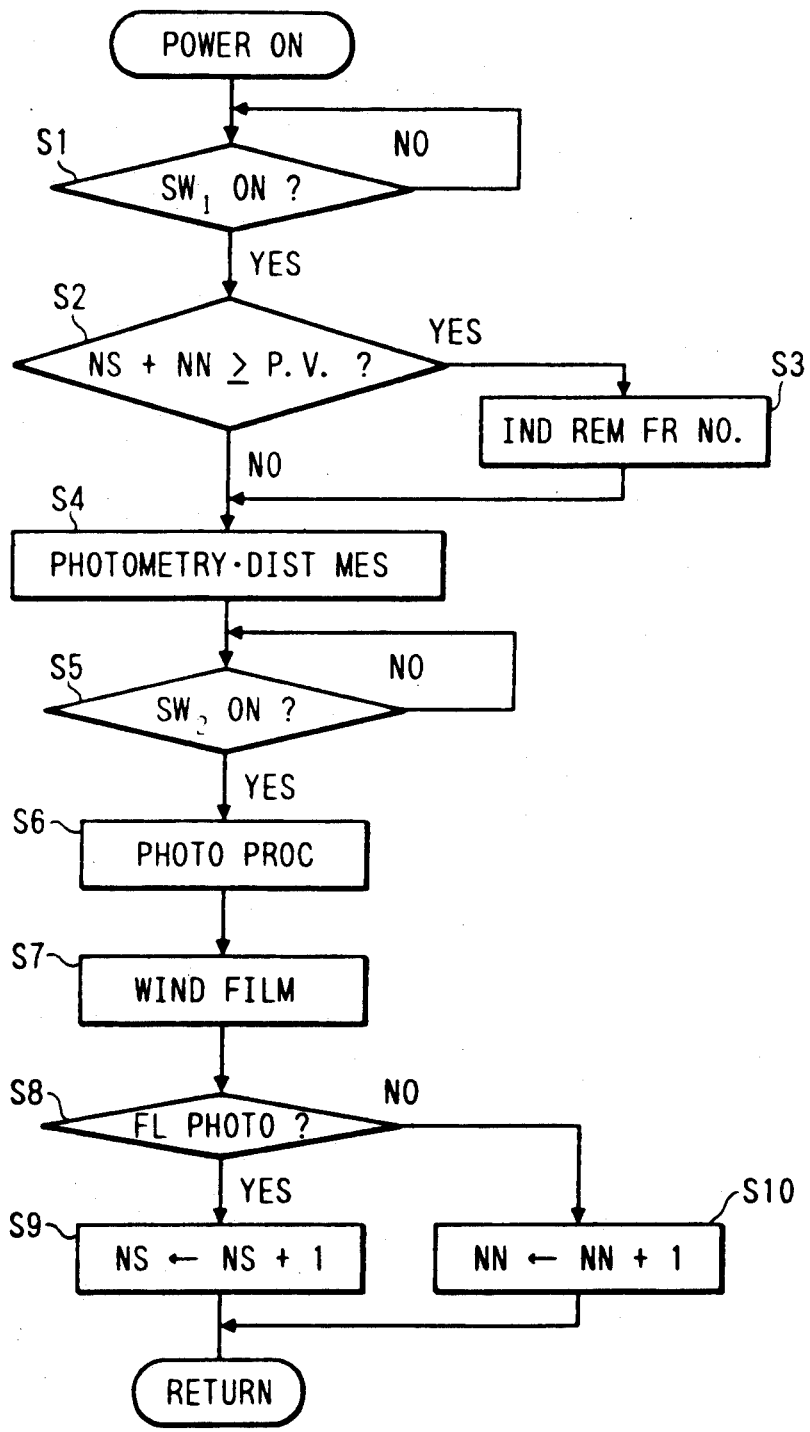

When a power supply switch which is not shown turns on, the program in FIG. 4 is started, and it is determined at the step S1 whether the said switch SW1 is in on position or not. When the switch is in off position, the turning on of the switch is waited, and the treatment proceeds to the step S2. At the step S2, it is determined whether the total number of times photographing is performed has reached a predetermined value or not. The controlling circuit 1 has two counters which count the number NS of times flashed photographing is performed and the number NN of times normal photographing is performed, and the sum of those counts represents the total number of times photographing is performed.

When the step S2 is negated, a step S4 is executed. Though calculation is performed at the step S3 to obtain the number of the remaining frames available for photographing as described later in detail. However, since photographing must have performed in the above number of times in order to perform this calculation, the step S3 is skipped when the total number of times photographing is performed has not reached the predetermined value. In another embodiment, the predetermined total number of times photographing is performed is set at, for example, 100 times or 200 times, or it is determined that the number of times photographing is performed has reached the predetermined value when the film is replaced five times.

At the step S4, a distance measurement circuit and a photometry circuit which are not shown are operated to perform distance measurement and photometry. At the step S5, it is determined whether the full-push switch SW2 is in on position or in off position; if it is in off position, the turning on of the switch is waited; and when the switch is turned on, photographing will be performed at the step S6.

A photographing lens (not shown) is driven to a predetermined focal point on the basis of the result of the said distance measurement; the value for aperture and shutter speed is decided on the basis of the result of the said photometry; and exposure is performed by driving the diaphragm and shutter by means of the exposure controlling circuit 2 on the basis of the value of aperture and shutter speed. In this treatment, when the shutter speed obtained is more than a predetermined limit value of the movement of the hand, normal photographing without using the electronic flashing device is performed, and when the shutter speed is slower than the limit value of the movement of the hand, flashed photographing using the electronic flashing device is performed (the light-emitting tube is caused to emit light through the light controlling circuit 3).

Next, in the step S7, the film is wound by one frame by means of a motor which is not shown, and then it is determined at the step S8 whether the photographing at the step S6 has been flashed photographing or normal photographing. In the case of flashed photographing, the count NS is advanced by "1" at the step S9, and in the case of normal photographing, the count NN is advanced by "1" at the step S10 and the treatment returns to the step S1. These counts NS and NN will be stored even if the said power supply switch is turned off.

On the other hand, when it is determined at the step S2 that the total number of times photographing is performed has reached the predetermined value, the treatment proceeds to indication of the number of the remaining frame at the step S3.

Figure 5:
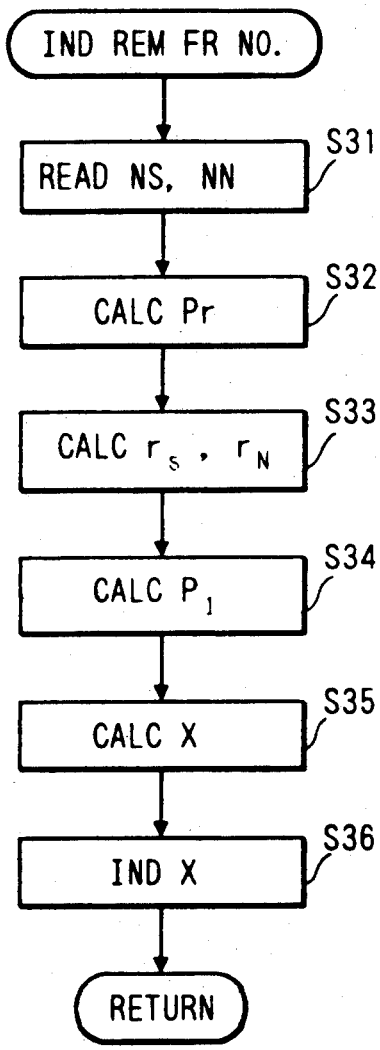

Referring to FIG. 5 which shows the details of the step S3, the said counts NS and NN are read at the step 31, and the amount of power consumed by the entire photographing until then is calculated on the basis of the counts NS and NN. When the power consumed by one time of flashed photographing is represented by $P_S$ and the power consumed by one time of normal photographing is represented by $P_N$; the amount of the power consumed by flashed photographing $P_{TS}$ and the amount of the power consumed by normal photographing $P_{TN}$ can be obtained as follows.

$$P_{TS} = NS \times P_S \qquad (1)$$

$$P_{TN} = NN \times P_N \qquad (2)$$

Therefore, the amount of the power consumed by the entire photographing PT can be calculated as follows.

$$P_T = P_{TS} + P_{TN} \qquad (3)$$

Next, at the step S33, the ratio of flashed photographing and the ratio of normal photographing to the entire photographing are obtained as follows using the said numbers of times photographing is performed NS and NN.

$$rS (\%) = \frac{NS}{NS + NN} \times 100 \qquad (4)$$

$$rN(\%) = 100 - rs \qquad (5)$$

Next, at the step S34, the remainder of the battery capacity $P_1$ is obtained as follows from the power consumed by the entire photographing $P_T$ which is obtained at the step S32, and the total capacity of the power supply batteries (the capacity before use) $P_0$.

$$P_1 = P_0 + P_T \qquad (6)$$

Since lithium batteries have less leakage and their capacity is relatively stable in general, the value of the said total battery capacity $P_0$ can be roughly obtained by experiment.

Next, at the step S35, the remaining number of frames available for photographing is calculated from the said calculated ratios rS and rN, and the remainder of the battery capacity $P_1$. When the number of the frames available for photographing is represented by X, the following equation can be obtained.

$$P_S \times rS \times X + P_N \times rN \times X = P_1$$

Then, the number of the remaining frames available for photographing X can be obtained as follows.

$$X = \frac{P_1}{(P_S \times rS + P_N \times rN)} \qquad (7)$$

The above calculations will be explained with reference to specific examples.

It is assumed here that the power consumed by one time of flashed photographing $P_S$ is 2(mAh); the power consumed by one time of normal photographing $P_N$ is 0.5 (mAh); and flashed photographing and normal photographing are performed 80 times and 120 times respectively among the 200 times of photographing. The power consumed by flashed photographing $P_{TS}$ and the power consumed by normal photographing $P_{TN}$ are then calculated as follows using the above equations (1) and (2).

$$P_{TS} = 80 \times 2(mAh) = 160 (mAh)$$

$$P_{TN} = 120 \times 0.5 (mAh) = 60 (mAh)$$

The power consumed by the entire photographing $P_T$ is calculated as follows using the above equation (3).

$$P_T = 160 (mAh) + 60 (mAh) = 220 (mAh)$$

Also, the ratio of flashed photographing rs and the ratio of normal photographing rN to the entire photographing are calculated as follows using the above equations (4) and (5).

$$rs (\%) = \frac{80}{80 + 120} \times 100 = 40(\%)$$

$$rN(\%) = 100 - 40 = 60(\%)$$

If it is assumed here that the total capacity of the power supply battery $P_0$ is 1000 (mAh), the remainder of the battery capacity $P_1$ is calculated as follows using the equation (6).

$$P_1 = 1000 (mAh) - 220 (mAh) = 780 (mAh)$$

Therefore, the number of the remaining frames available for photographing X is calculated as follows using the equation (7).

$$X = \frac{780 (mAh)}{2 (mAh) \times 0.4 + 0.5 (mAh) \times 0.6} = 709 \text{ (frames)}$$

After the calculation of the number of the remaining frames available for photographing, the operation proceeds to the step S36 wherein a indicating signal is output to the indicating circuit 4 and the number of the remaining frame available for photographing X which has been calculated is display using the segments 5a through 5e of the liquid crystal indication device 5.

In the embodiment as described above, when the total number of times photographing is performed exceeds a predetermined value, the ratio of flashed photographing and normal photographing which have been performed by a photographer, and the remainder of the battery capacity P are obtained through the half-push operation, on the basis of the numbers of times flashed photographing and normal photographing are performed. And, on the assumption that the photographer will continue to photograph in the said ratio, the remaining number of frames available for photographing is calculated and indicated on the basis of the ratio and remainder of the battery capacity. Therefore, it is possible to know how many frames are available for photographing thereafter regardless of the ratio of flashed photographing and normal photographing.

The number of the frames available for photographing X obtained here has been calculated from the ratio of flashed photographing and normal photographing performed in the past and photographing in the future will not necessarily performed in this ratio. Also, the amount of the power consumed by one time of photographing varies depending on the temperature at the time of use which is not taken in consideration in the above calculation. For these two reasons, the number of the frames available for photographing X which has been obtained by the calculation is not necessarily accurate, and it is therefore preferable that the number of the frames available for photographing is roughly indicated as a guideline. Accordingly, the segments 5a through 5e of the said liquid crystal indication device 5 are in a unit of 100 frames.

In the configuration of the above embodiment, the controlling circuit 1 constitutes the counting means 102, ratio calculating means 103, capacity detecting means 104, and frame number calculating means 105.

Figure 6:
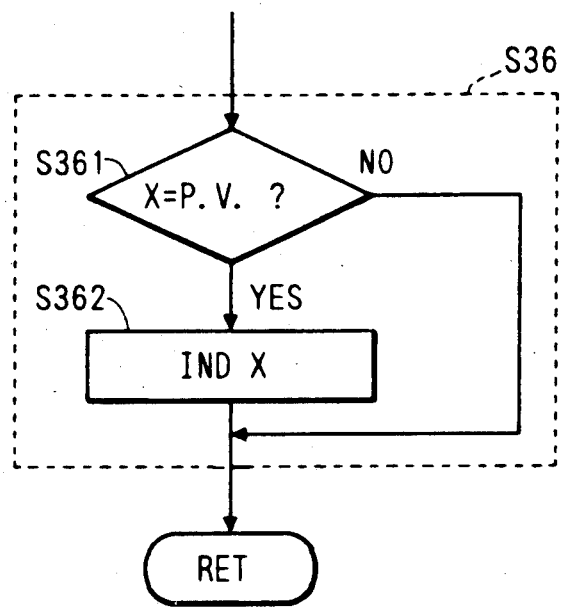
FIG. 6 is a flow chart showing an example of modified forms.
Figure 7A:
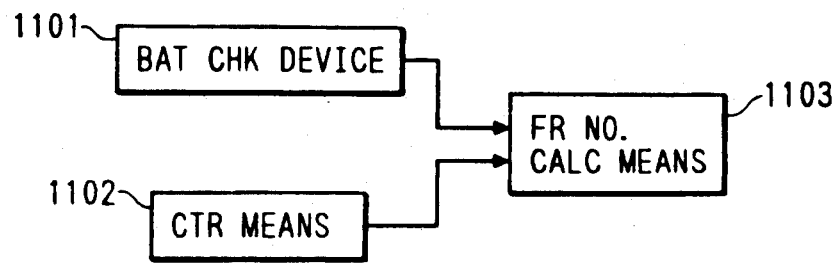
FIG. 7A and FIG. 7B are drawings to explain this invention.
Figure 7B:
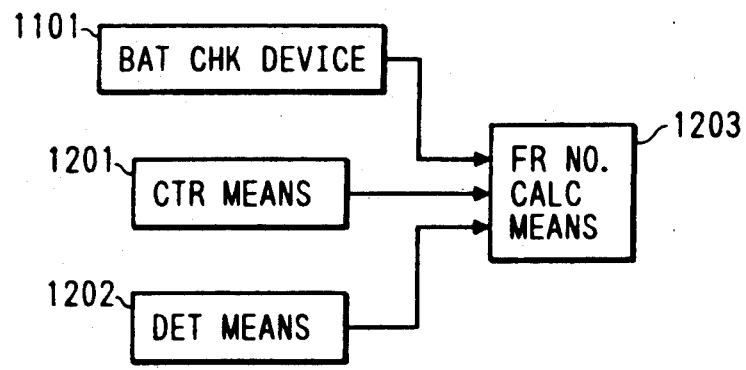

Also, another embodiment is configured by replacing the step S36 in FIG. 5 with the step S36' in FIG. 6. In this case, after the step S35, it is determined at the step S361 whether the number of the remaining frames available for photographing is less than a predetermined value or not. In the case of affirmation, indication is given at the step S362 as described above, and in the case of negation, indication is not given and the treatment returns to that in FIG. 4.

Thus, the number of the remaining frames available for photographing X will be great when the photographer has not performed almost no flashed photographing, but it is useless to indicate when there are a number of remaining frames even if the total number of times photographing is performed has reached a predetermined value. Thus, in FIG. 6, display is given only when the number of the frames available for photographing becomes less than 500 frames, for example.

In the above explanation, the number of the remaining frames available for photographing is indicated when the half-push operation is conducted, but the indication may be done, for example, through the operation on a button which is separately provided. Also, while the power consumption is calculated from the total number of times photographing is performed, and the remainder of the battery capacity is calculated from the power consumption and the total capacity of the power supply batteries, the said remainder may be obtained by detecting the power supply voltage directly.

With this invention, since the numbers of times flashed photographing and normal photographing are counted; the ratio of flashed photographing and normal photographing is calculated from the counts; and the number of the remaining frames available for photographing is calculated from the ratio and the remainder of the battery capacity, it is possible to exactly know how many frames are available for photographing regardless of the ratio in which a photographer performed flashed photographing and normal photographing, and what is really demanded by photographers is thus satisfied.

Another embodiment of this invention will be described with reference to FIG. 8 through FIG. 11.

Figure 8:
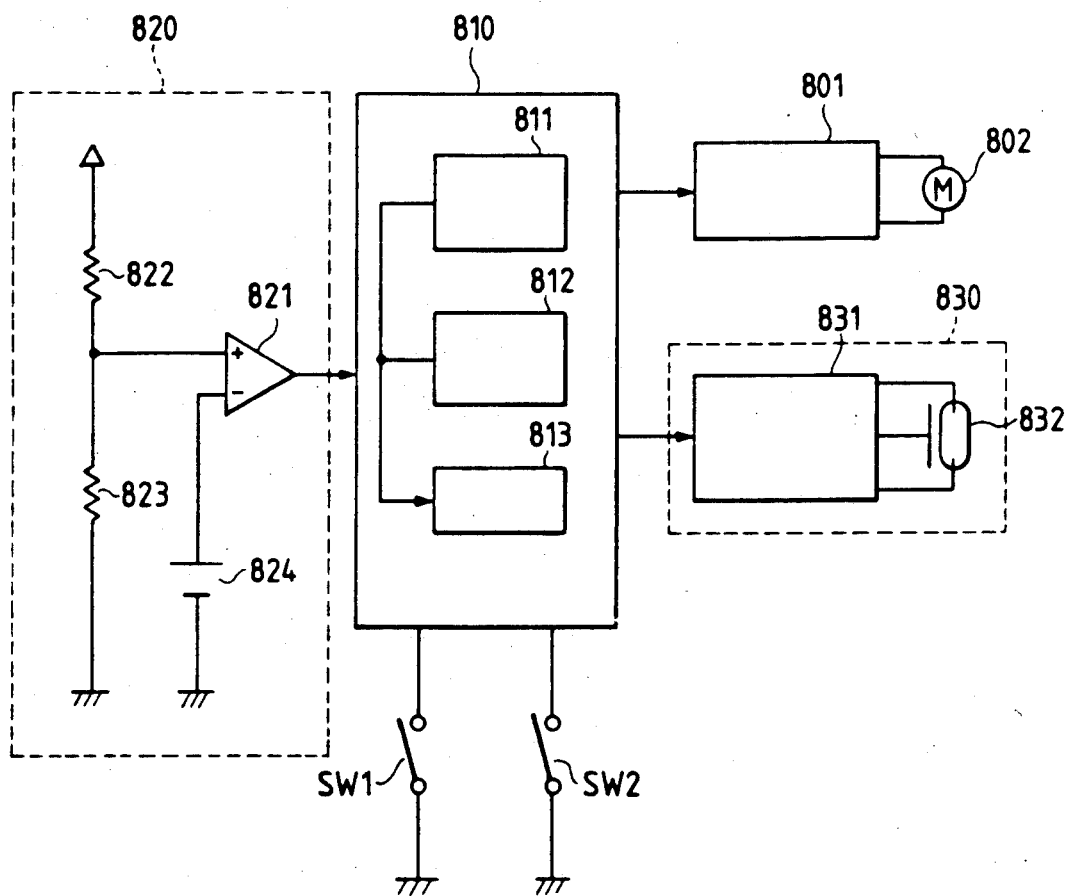
FIG. 8 through FIG. 11 are illustrative of another embodiment of this invention.

In FIG. 8 which shows the overall configuration, 820 is a battery check circuit comprising a comparator 821, resistors 822 and 823, and a reference power supply 824. A voltage which is the power supply voltage (the voltage of power supply batteries which are not shown) divided by the resistors 822 and 823, and the reference voltage of the reference power supply 824 are input to the comparator 821 which outputs a signal at low level when the said divided voltage becomes lower than the reference voltage. The fact that the said divided voltage becomes lower than the reference voltage indicates that the power supply voltage has been consumed so as to become a predetermined voltage, and photographing cannot be performed with that voltage.

The output signal of the comparator 821 is input to a controlling circuit 810 which controls the sequence of the entire camera. This controlling circuit 810 comprises a normal photographing counter 811 which counts the number of times normal photographing without an electronic flashing device 830 which is described later is performed, a flashed photographing counter 830 which counts the number of times flashed photographing using the electronic flashing device 830 is performed, and a calculating portion 813.

Also, an exposure controlling circuit 801 to which a motor 802 for driving shutter is connected, the electronic flashing device 830 comprising a light controlling circuit 831 and a light-emitting tube 832, and switches SW1 and SW2 which turn on in response to the operation of a release button which is not shown, are also connected to the controlling circuit 810. The exposure controlling circuit 801 performs photographing by driving a shutter (not shown) by means of a motor 802 in response to the instruction from the controlling circuit 810. Light controlling circuit 831 causes, by means of the charge accumulated in a main capacitor which is not shown, a light-emitting tube 832 to emit light in response to a light-emission signal from the controlling circuit 810. The switch SW1 turns on when half-push operation is performed on the release button, and the switch SW2 turns on when the button is fully pushed.

Next, the steps of the control which is carried out by the controlling circuit 810 will be described with reference to the flow chart in FIG. 9 through FIG. 11.

When the main switch which is not shown is turned on, this program is started, and it is determined at the step S801 whether the said switch SW1 is in on position or not. When the switch is in off position, the turning on of the switch is waited, and the treatment proceeds to the step S802 when the switch is turned on. At the step S803, the output of the comparator 821 which constitutes the battery check circuit 820 is read, and it is determined whether the output is at low level or not. When it is determined not to be at low level, the step S804 is executed. The fact that the output of the comparator 821 is not at low level indicates that the power supply voltage is higher than a predetermined value, and photographing can be performed.

The luminance of subjects and distance to subjects which are the results of the detection by a photometry circuit and a distance measurement circuit (not shown) are input at the steps S804 and S805 respectively (photometry treatment and distance measurement treatment), and it is then determined at the step S806 whether the full-push switch SW2 is in on position or not. When it is in off position, the turning on of the switch is waited, and the treatment proceeds to the step S807 when the switch is turned on.

At the step S807, focusing is performed on the basis of the distance to subjects obtained by the distance measurement treatment; the value for exposure (the value for aperture and shutter speed) is calculated on the basis of the luminance of subjects obtained by the photometry treatment; and photographing is performed by driving the diaphragm or shutter on the basis of the value for exposure calculated by the exposure controlling circuit 1. In this treatment, when the shutter speed obtained is faster than a predetermined limit value of the movement of the hand, normal photographing without using the electronic flashing device is performed, and when the shutter speed is slower than the limit value of the movement of the hand, flashed photographing using the electronic flashing device is performed (the light-emitting tube 832 is caused to emit light through the light controlling circuit 831).

Next, at the step S808, it is determined whether the photographing at the step S807 has been flashed photographing or normal photographing. In the case of flashed photographing, the count SN of the flashed photographing counter 822 is advanced by "1" at the step S809, and in the case of normal photographing, the count NN of the normal photographing counter 812 is advanced by "1" at the step S810, and the treatment proceeds to the step S811. At the step S811, the film is wound by one frame by means of a winder which is not shown, and the treatment then returns to the step S801 and the above treatment is repeated. The said counts SN and NN is reset to 0 when power supply batteries are installed and thereafter they will be stored even if the main switch is turned off.

On the other hand, when the output of the comparator 821 is determined to be at low level at the said step S803, it is judged that the power supply voltage is lower than a predetermined value and photographing cannot be performed with that power supply voltage, and in this case, the treatment proceeds to a battery capacity calculating treatment at the step S812 without performing photographing. The treatment at this step S812 is carried out only when the camera contains the first power supply batteries which have been installed after the manufacture of the same camera.

Figure 10:
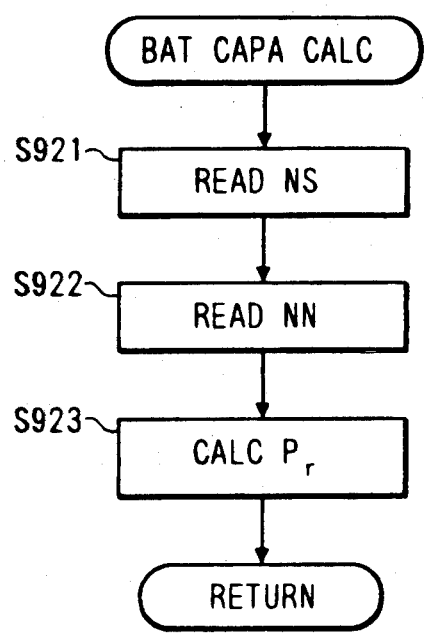

Referring to FIG. 10 which shows the details of the step S812, the count NS of the flashed photographing counter 812 (the number of times flashed photographing is performed) and the count NN of the normal photographing counter 11 (the number of times normal photographing is performed) are read by the steps S921 and S922 respectively, and the amount of power consumption until then is calculated on the basis of the counts NS and NN at the step S923. When the power consumed by one time of flashed photographing is represented by $P_S$ and the power consumed by one time of normal photographing is represented by $P_N$, the amount of the power consumed by flashed photographing $P_{TS}$ and the amount of the power consumed by normal photographing $P_{TN}$ can be obtained by the following as mentioned above.

$$P_{TS} = NS \times P_S \qquad (1)$$

$$P_{TN} = NN \times P_N \qquad (2)$$

Therefore, the amount of the power consumed by the entire photographing P can be calculated as follows.

$$P_T = P_{TS} + P_{TN} \qquad (3)$$

Figure 9:
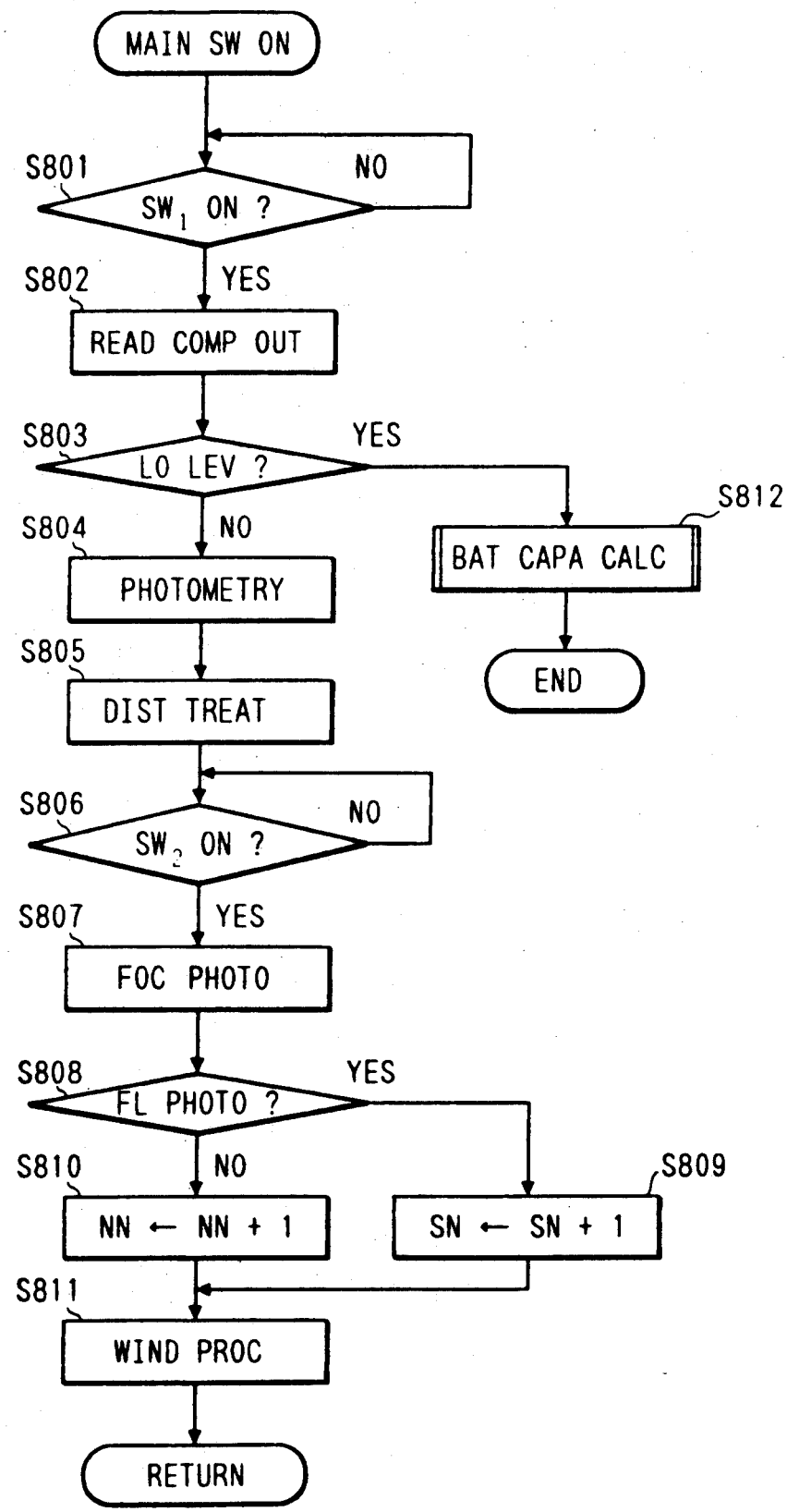

Since the treatment in FIG. 10 is the treatment which is carried out only when the power supply voltage is determined to be lower than a predetermined value at the step S803 in FIG. 9, the power consumption $P_T$ calculated by the above equation (3) can be regarded as the substantial capacity (the capacity before use) of the power supply batteries which are used for photographing. The substantial capacity $P_T$ of the power supply battery is thus calculated for the following reason.

Though lithium batteries which are frequently used in recent years have less variation in the capacity of themselves, the reference voltage of the reference power supply 824 which constitutes the said battery check circuit 820 varies depending on cameras, and therefore, the battery capacity $P_T$ used for photographing varies depending on cameras even if batteries having the same capacity are used. The battery capacity $P_T$ is used for calculation of the number of the remaining frames available for photographing which will be described later, but if the calculation is carried out assuming this capacity $P_T$ as a constant value, the correct number of frames cannot be obtained for some cameras due to the said variation. Therefore, a battery capacity $P_T$ which depends on the camera, and more particularly which depends on the reference voltage of the battery check circuit 820 used in the camera is obtained here.

The above calculations will be explained with reference to specific examples.

It is assumed here that the power consumed by one time of flashed photographing $P_S$ is 2(mAh); the power consumed by one time of normal photographing $P_N$ is 0.5(mAh); and flashed photographing and normal photographing are performed 400 times each when the step S3 is affirmed. The power consumed by flashed photographing $P_{TS}$ and the power consumed by normal photographing $P_{TN}$ are then calculated as follows using the above equations (1) and (2).

$$P_{TS} = 400 \times 2 \ (mAh) = 800 \ (mAh)$$

$$P_{TN} = 400 \times 0.5 \ (mAh) = 200 \ (mAh)$$

The power consumed by the entire photographing $P_T$ is calculated as follows using the above equation (3).

$$P_T = 800 \ (mAh) + 200 \ (mAh) = 1000 \ (mAh)$$

Figure 11:
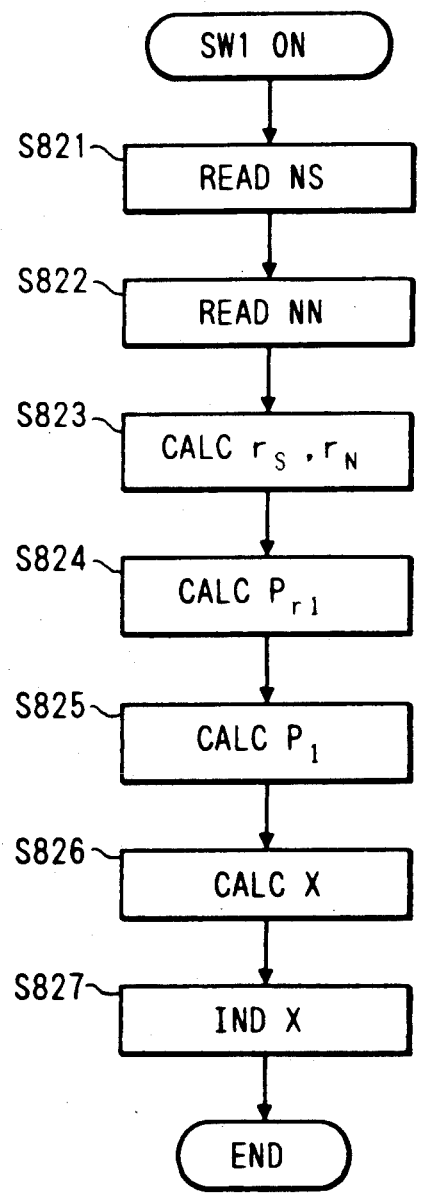

FIG. 11 shows a treatment wherein the number of the remaining frames which can be photographed with batteries which has been newly installed is calculated and indicated on the basis of the substantial battery capacity $P_T$ obtained through the treatment in FIG. 10. This program is interrupted and activated after the batteries are replaced with new ones each time, for example, the half-push switch SW1 is turned on. It may be activated by the operation of a switch which is separately provided.

In FIG. 11, the counts NS and NN of flashed photographing and normal photographing respectively are read at the steps S821 and S822 as done at the said steps S921 and S922 in FIG. 10. Next, at the step S823, the ratio of flashed photographing rS and the ratio of normal photographing rN until now after batteries are newly installed are obtained by the aforementioned equations as follows using the number of times both type of photographing are performed NS and NN.

$$rS \ (\%) = \frac{NS}{NS + NN} \times 100 \qquad (4)$$

$$rN \ (\%) = 100 - rS \qquad (5)$$

In the step S824, the power consumption $P_{T1}$ until now after batteries are newly installed is calculated on the basis of the said equations (1), (2) and (3), and at the step S825, the remainder of the battery capacity $P_1$ is obtained by the aforementioned equation as follows from the power consumption $P_{T1}$ calculated at the step S824 and the substantial capacity of the power supply batteries $P_T$ calculated at the step S923 (FIG. 10), and the treatment proceeds to the step S826.

$$P_1 = P_T - P_{T1} \qquad (6)$$

At the step S826, the number of the remaining frames available for photographing is calculated from the remainder of the battery capacity $P_1$ and the ratios rs and rN calculated at the step S823. When the number of the frames available for photographing is represented by X, the following equation can be obtained on the assumption that photographing will be performed in the future in the said ratios rs and rN.

$$P_S \times rS \times X + P_N \times rN \times X = P_1$$

Then, the number of the remaining frames available for photographing X can be obtained as follows.

$$X = \frac{P_1}{(P_S \times rS + P_N \times rN)} \quad (7)$$

The above calculations will be explained with reference to specific examples.

Similarly to the previous explanation, it is assumed here that the power consumed by one time of flashed photographing $P_S$ is 2 (mAh); the power consumed by one time of normal photographing $P_N$ is 0.5 (mAh); and flashed photographing and normal photographing are performed 200 times and 300 times respectively until now after batteries are newly installed. The power consumed by flashed photographing $P_{TS}$ and the power consumed by normal photographing $P_{TN}$ are then calculated as follows using the above equations (1) and (2).

$$P_{TS} = 200 \times 2 \ (mAh) = 400 \ (mAh)$$

$$P_{TN} = 300 \times 0.5 \ (mAh) = 150 \ (mAh)$$

The power consumed by the entire photographing $P_{Tl}$ is calculated as follows using the above equation (3).

$$P_{Tl} = 400 \ (mAh) + 150 \ (mAh) = 550 \ (mAh)$$

Also, the ratio of flashed photographing rs and the ratio of normal photographing rN to the entire photographing are calculated as follows using the above equations (4) and (5).

$$rS \ (\%) = \frac{200}{200 + 300} \times 100 = 40(\%)$$

$$rN(\%) = 100 - 40 = 60(\%)$$

If it is assumed here that the substantial capacity of the power supply battery $P_T$ is 1000 (mAh), the remainder of the battery capacity $P_1$ is calculated as follows using the equation (6).

$$P_1 = 1000 \ (mAh) - 550 \ (mAh) = 450 \ (mAh)$$

Therefore, the number of the remaining frames available for photographing X is calculated as follows using the equation (7).

$$X = \frac{450 \ (mAh)}{2 \ (mAh) \times 0.4 + 0.5 \ (mAh) \times 0.6} \approx 410 \ (Frames)$$

After the calculation of the number of the remaining frames available for photographing, the operation proceeds to the step S827 wherein the number of the frames X is indicated, for example on a liquid crystal indication device through an indication circuit which is not shown.

According to the procedures in FIG. 11 as described, when for example half-push operation on the release button (turning the switch SW1 on) is performed after new power supply batteries are installed, the number of the remaining frames which can be photographed with the batteries which have been newly installed is calculated and indicated on the basis of the numbers of times flashed photographing and normal photographing have been performed, NS and NN, and the substantial capacity of the batteries $P_T$ which depends on the camera calculated in FIG. 4. (This depends on the number of times photographing is performed when the power supply voltage has become lower than the reference voltage).

Therefore, it is possible to exactly know how many frames are available for photographing even if the reference voltage of the battery check circuit 820 varies depending on cameras.

Also, in this embodiment, since the numbers of times both of flashed photographing and normal photographing are performed ratio, and the number of remaining frames available for photographing is calculated on the basis of both counts, it is possible to exactly know the said number of the remaining frames available for photographing regardless of the ratio in which the photographer performed flashed photographing and normal photographing.

In the configuration of the above embodiment, the battery check circuit 820, the counters 811 and 812 of the controlling circuit 810, and the calculating portion 813 constitutes the battery check device 1101, the counting means 1102, and the frame number calculating means 1103 respectively.

Still another embodiment of this invention will be described with reference to FIG. 12 and FIG. 13.

In the embodiment described above, since the substantial capacity of the power supply voltage is obtained from the number of times photographing is performed after new batteries are installed and until the power supply voltage is judged to be lower than the predetermined value, it is not possible to exactly know the substantial capacity of the batteries $P_T$ when, for example, the power supply batteries are replaced before the power supply voltage becomes lower than the predetermined value. And, it is obvious that the number of the remaining frames available for photographing will be inaccurate when this inaccurate capacity of the batteries $P_T$. This still another embodiment solved such a problem by detecting the replacement of batteries.

Figure 12:
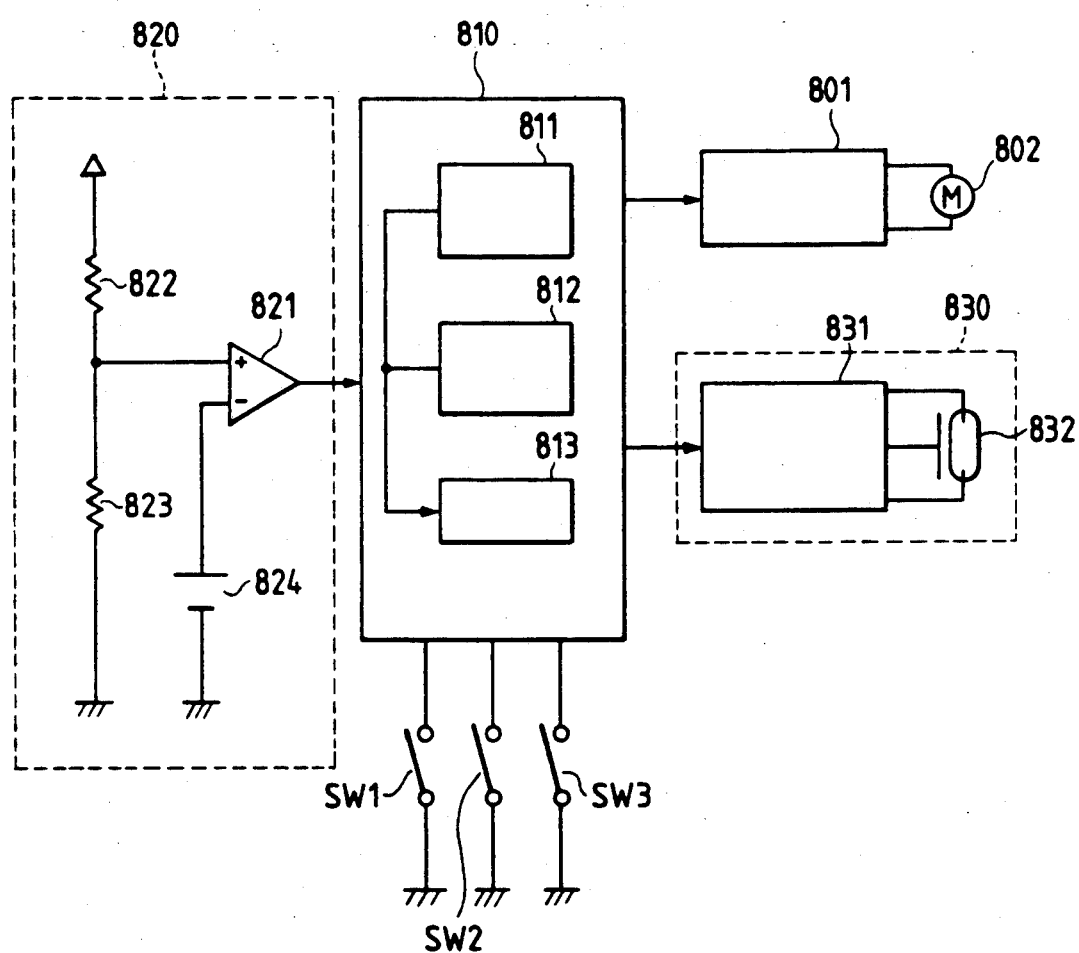
FIG. 12 and FIG. 13 are illustrative of still another embodiment of this invention.

FIG. 12 is illustrative of the configuration of this embodiment which is configurated by adding a switch SW3 to the configuration in FIG. 8. The switch SW3 is a switch which is turned on/off as the power supply batteries are installed and removed: it is turned off when the batteries are installed; and it is turned on when the batteries are removed.

Similarly to the previous explanation, in this embodiment, the program in FIG. 9 is activated as the main switch is turned on, but when the step S3 is negated, it returns without carrying out the treatment at the step S812.

Figure 13:
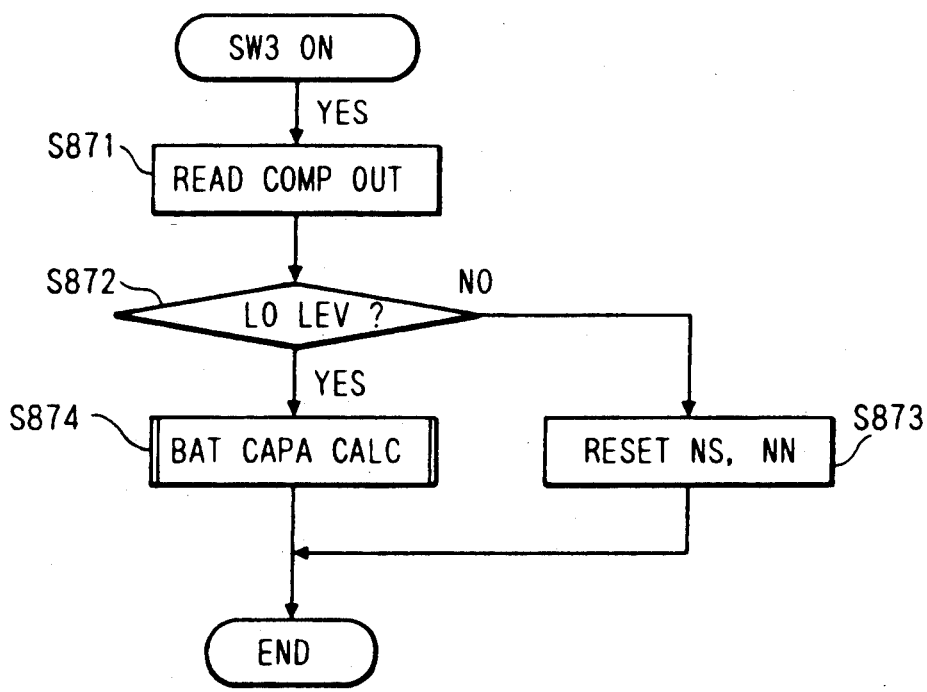

The program in FIG. 13 is activated as the switch SW3 is turned on, in other wards, it is activated as the power supply batteries are removed. This program can be activated even after the power supply batteries are removed by means of a standby power supply, and the output signal of the said comparator is retained for a predetermined time after the power supply batteries are removed.

First, the output signal of the comparator 821 which constitutes the battery check circuit 820 is read at the step S871, it is then determined at the step S872 whether the output is at low level or not. When it is determined not to be at low level the said counts NS and NN are reset to 0 at the step S873, and when it is determined to be at low level the treatment proceeds to the battery capacity calculation treatment at the step S874. This treatment is the same treatment as the aforementioned treatment in FIG. 4. The fact that the output of the comparator 821 is at low level indicates that the power supply voltage is lower than the predetermined value, and photographing cannot be performed.

When for example the half-push switch SW1 is turned on after new batteries are installed, the aforementioned program in FIG. 11 is activated each time, and the number of the remaining frames available for photographing X is calculated and indicated.

Thus, in the above procedure, in the case that the voltage of the power supply batteries is lower than the predetermined value when they are removed, the said capacity of the batteries $P_T$ is calculated on the basis of judgement that the batteries are being replaced because the capacity of the batteries has decreased so as to disable photographing, but in the case that the power supply voltage is higher than the predetermined value, the counts NS and NN are cleared on the basis of judgement that the batteries are being replaced in spite of their capacity which is high enough to enable photographing. In this case, only when no battery replacement is done after installation of batteries and until the capacity of the batteries becomes lower than the predetermined value, the capacity of the batteries is calculated from the number of times photographing is performed in that period. Therefore, the capacity of batteries $P_T$ is accurately obtained, and it will be possible to always obtain accurate number of the remaining frames available for photographing. In the configuration of the above embodiment, the counters 811 and 812, the switch SW3, and the calculating portion 813 constitute the counting means 1201, the detecting means 1202, and the frame number calculating means 1203 respectively.

Though the explanation has been made on cameras which incorporate an electronic flashing device, this invention may be applied to cameras without an electronic flashing device. In this case, each of the above calculations is carried out using only the number of times normal photographing is performed NN.

In the above embodiment, the substantial capacity of the batteries $P_T$ is obtained, and the number of the remaining frame available for photographing X is calculated on the basis of the capacity obtained. However, since the number of times photographing is performed (counted by the counters 811 and 812) when the power supply voltage has become lower than the predetermined value depends on the said substantial capacity of batteries $P_T$, the number of the remaining frames available for photographing can be directly obtained on the basis of this number of times photographing is performed and the number of times photographing is performed with the batteries which are newly installed.

According to this invention, the number of the remaining frames which can be photographed with the batteries which have been newly installed is obtained on the basis of the number of times photographing is performed when the power supply voltage has become lower than the reference voltage. Therefore, even if the reference voltage of the battery check device varies depending on cameras, it is possible to identify and notify how many pictures can be photographed with the camera, thereby satisfying what is really demanded by photographers.

Further, according to this invention, the number of the remaining frames which can be photographed with the batteries which have been newly installed in the case that the power supply voltage is lower than the reference voltage at the time of replacement of the power supply batteries. Therefore, the same advantage as described above can be obtained and it is possible to accurately obtain the number of the remaining frames available for photographing even if the power supply batteries are replaced before they are exhausted.

We claim:

1. A battery check device for cameras comprising:
    a counting means for counting the number of times photographing is performed by cameras;
    a detecting means for detecting the remainder of the capacity of a battery; and
    a determining means for determining the number of the remaining pictures which can be taken on the basis of the counted number of times photographing has been performed and the detected remainder of the capacity of the battery.

2. A battery check device for cameras which incorporate an electronic flashing device and which can perform flashed photographing using the flashing device and normal photographing without using the electronic flashing device comprising:
    a counting means for counting the number of times the flashed photographing is performed and the number of times the normal photographing is performed respectively;
    a determining means for determining the ratio of the numbers of times flashed photographing and normal photographing are performed from both of the numbers of times photographing is performed;
    a capacity detecting means for detecting the remainder of the capacity of a battery; and
    a frame number determining means for determining the number of the remaining frame available for photographing from the determined ratio and the detected remainder of the capacity of the battery.

3. A battery check device according to claim 2 further comprising:
    an indicating means for indicating the number of pictures which can be taken determined by the frame number determining means.

4. A battery check device according to claim 3 wherein the indicating means indicates only when the remaining number of times photographing is performed is less than a predetermined value.

5. A battery check device according to claim 3 wherein the indicating means is a liquid crystal plate.

6. A battery check device for cameras comprising:
    a detecting means for detecting the fact that the voltage of the battery of a camera has decreased below a predetermined value;
    a counting means for counting the number of times photographing is performed;
    a memory means for memorizing the number of times photographing is performed when the voltage of the battery has decreased below the predetermined voltage; and a frame number determining means for determining the number of frames which can be photographed with the batteries which have been newly installed on the basis of the memorized number of times photographing is performed.

7. A battery device for cameras comprising:

a detecting means for detecting the voltage of the battery of a camera and comparing it with a predetermined value;

a counting means for counting the number of times photographing is performed;

a replacement detecting means for detecting replacement of a battery;

a memory means which memorizes the number of times photographing has been performed in the case that a battery is replaced when the voltage of the battery is lower than the predetermined voltage, and which does not memorize the number of times photographing has been performed at the time of replacement of the battery in the case that the battery is replaced when the voltage of the battery is higher than the predetermined value; and a frame number determining means for determining the number of the remaining frame which can be photographed with the battery which has been newly installed on the basis of the memorized number of times photographing has been performed.

8. A battery check device according to claim 7 wherein the camera is equipped with an electronic flashing device;

the counting means counts respectively the number of times flashed photographing using the electronic flashing device, and normal photographing without using the electronic flashing device are performed; and the frame number determining means determines the number of the remaining pictures which can be taken on the basis of both of the numbers of times photographing is performed.

* * * * *